A. RUSSELL.

Ships' Windlasses.

No. 5,959. Reissued July 7, 1874

Witnesses
Chas. J. Koch
C. M. Brooks

Inventor
Albert Russell
by his attorney
Colborne Brooks

BEST AVAILABLE COPY

UNITED STATES PATENT OFFICE.

ALBERT RUSSELL, OF NEWBURYPORT, MASSACHUSETTS.

IMPROVEMENT IN SHIPS' WINDLASSES.

Specification forming part of Letters Patent No. 105,982, dated August 2, 1870; reissue No. 5,959, dated July 7, 1874; application filed May 5, 1874.

*To all whom it may concern:*

Be it known that I, ALBERT RUSSELL, of Newburyport, in the county of Essex and State of Massachusetts, have invented an Improvement in Windlasses, of which the following is a specification:

The object of this invention is to obtain a windlass-purchase which can be so arranged as to obtain a greater leverage on the windlass, and at the same time be more compact in its arrangement, and for this reason better adapted to the wants of large ships.

All windlass-beams, to the best of my knowledge and belief, have, previous to my invention, been constructed with a single pivot centrally arranged, and with their ends alike either for the insertion of brakes, or the attachment of some additional mechanism for obtaining a purchase on the beam. This class of beam may or may not be used in connection with my invention, but is not necessarily a part of the same; but my invention consists of the peculiarly-constructed half-beams, whether used in connection with a third beam, as before mentioned, or independently employed, as will be described.

When a single beam is used in a windlass it must be of sufficient length to reach the pawl-case connections, which are arranged on each side of the bowsprit and "samson-post" of the vessel; and in large vessels this causes so much spread from the center that, in order to obtain a sufficient leverage with such a beam alone, the brakes would have to be of such length that their ends would project overboard, the vessel being comparatively narrow at the bows where the windlass is placed.

Various systems of compound purchase have, therefore, been employed to obviate this difficulty; but this invention shows the simplest and most desirable known to me.

Figure 1:
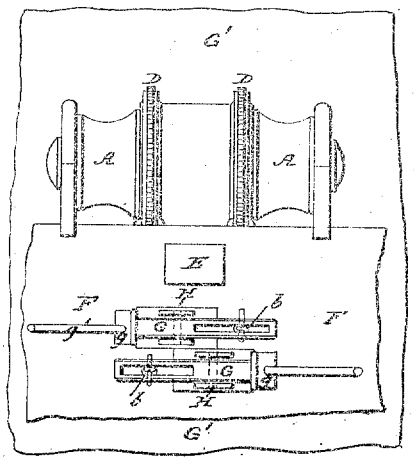
Figure 2:
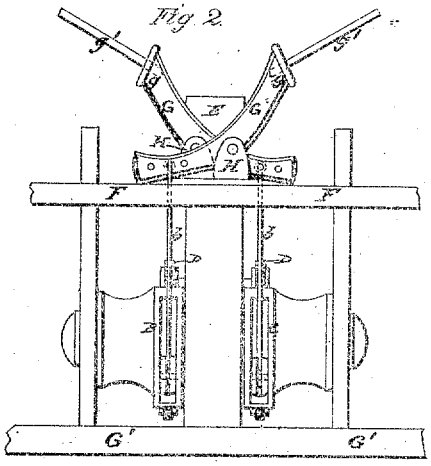

In the accompanying drawings, which form part of this specification, Figure 1 represents a plan, and Fig. 2 a front elevation, of a windlass with my improvements applied thereto.

A represents the windlass, and B and C its two pawl-cases or working-pawl carriers, the pawls of which take into ratchets D D, constructed and applied to the windlass A in the usual manner. The pawl-cases B C are arranged in the usual way on each side of the bows, it and samson-post E. Above the deck or platform F, disposed over the main deck G′ and over the pawl-cases, I arrange the half-beams G G, pivoted to and having their fulcrums in posts or standards H H, fixed to the upper deck. The half-beams B C are provided at one end with sockets, as at *g*, for the insertion of the brakes *g′*, while their opposite ends are slotted or provided with ears to receive one end of the connection or pawl-case rods *b b*, or a third beam.

By seamen taking hold of the longer arm of each of the brakes or levers, and moving it up and down, each pawl-case will have a reciprocating or vibratory movement imparted to it, whereby it, with its pawl and ratchet, will be caused to revolve the windlass.

Under ordinary circumstances a single brake-lever connected to the two pawl-case rods arranged athwart ships, and having its fulcrum at its middle and between the rods, is employed; or, instead of such two, levers connected by an intermediate lever, and supported by vibratory posts, are used, such being as shown in the Patent No. 16,000, granted November 4, 1856, to Christopher Amazeen.

The advantages of two independent brake-levers, one to each pawl-case, as represented in the drawing, are that such admit of the windlass being worked by one of the brake-levers without the other being moved or interfering in any way with the operation of the first. They also admit of both pawl-cases being worked in the same direction at once, thereby enabling the operatives to exert their power with better or more useful effect.

There are other important advantages possessed by the employment of independent levers with separate fulcrums, as it admits of longer levers being used. These can well be employed when two levers are connected by a third, as in the Amazeen windlass.

Having thus described my invention, what I claim, and desire to secure by Letters Patent, is—

1. The two disconnected half-beams G G, combined with the windlass, its ratchets, and their pawl-cases, operating substantially as specified.

2. The half-beam for a windlass-purchase, working on its own fulcrum, with a socket on one end to receive the brake, and provided with a slot or ears at the other end, substantially as and for the purposes specified.

ALBERT RUSSELL.

Witnesses:

GEORGE H. STUART,
A. W. GREENLEAF